Sept. 7, 1926.  
S. J. BOUGHTON  
TRANSMISSION LOCK  
Filed Jan. 25, 1922    2 Sheets-Sheet 1
1,599,201
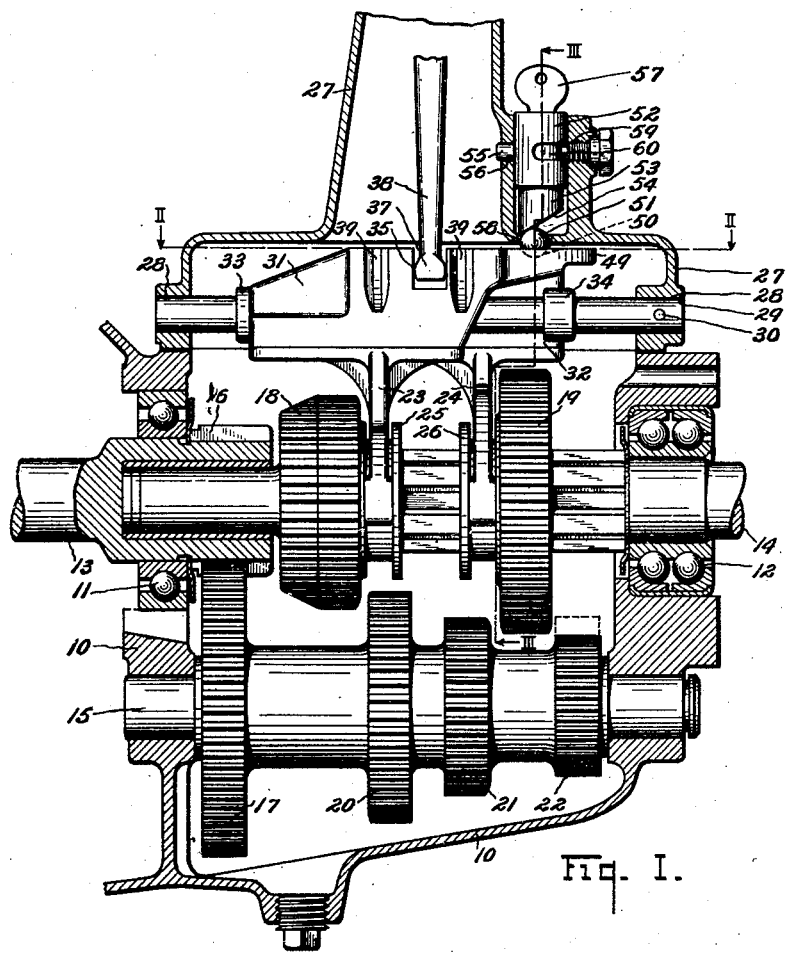
Fig. I.
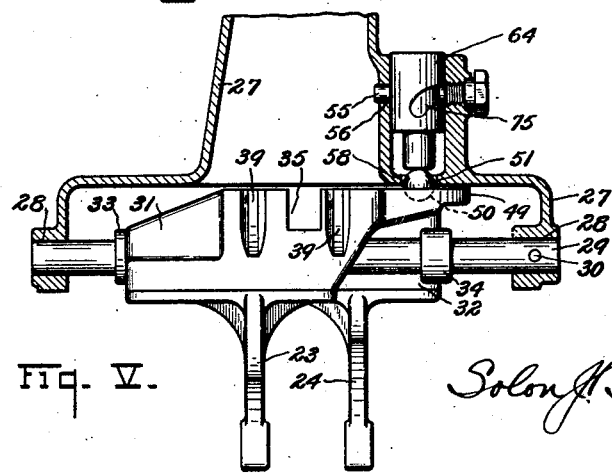
Fig. V.
INVENTOR.  
Solon J. Boughton Sept. 7, 1926.
S. J. BOUGHTON
TRANSMISSION LOCK
Filed Jan. 25, 1922
1,599,201
2 Sheets-Sheet 2
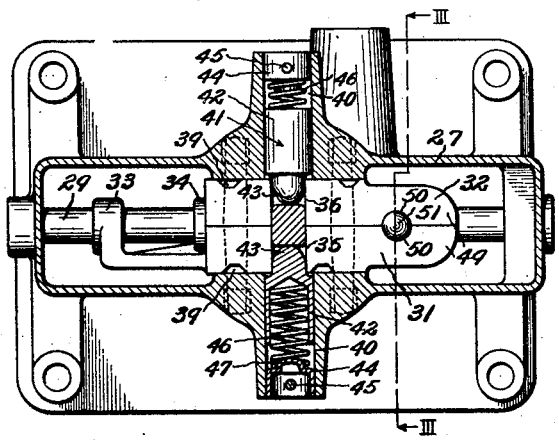
Fig. II.
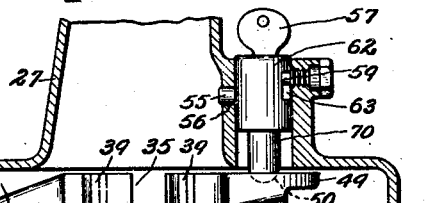
Fig. IV.
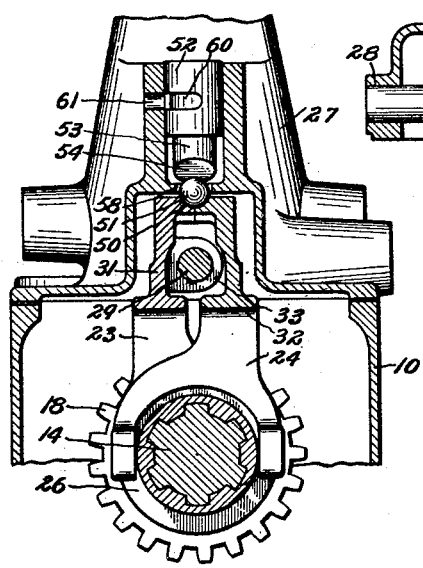
Fig. III.
INVENTOR.
Solon J. Boughton.

Patented Sept. 7, 1926.

1,599,201

UNITED STATES PATENT OFFICE.

SOLON J. BOUGHTON, OF TOLEDO, OHIO, ASSIGNOR TO THE WILLYS-OVERLAND COMPANY, OF TOLEDO, OHIO, A CORPORATION OF OHIO.

TRANSMISSION LOCK.

Application filed January 25, 1922. Serial No. 531,583.

This invention relates to locking mechanism for automotive vehicles, and consists particularly in means for locking against movement, the shifter members of slidable gear transmissions.

One object of the invention is the provision of means which will dispense with the necessity of a spring for supporting the locking plunger in its inoperative position.

Another object is the provision of a locking means which will constantly tend to take the locking position on account of the force of gravity, and which will readily move out of such position by the mere sliding of one of the shifter members out of neutral position, and which will offer substantially no resistance to such sliding movement.

A further object is the provision of a key operated lock for holding in locking position the locking means mentioned in the preceding paragraph.

Still another object of the invention is to provide a mechanism of the character described, which is of simple construction and efficient in operation.

Further objects of this invention relate to economies of manufacture and details of construction, as will hereinafter appear from the detailed description to follow.

The objects of the invention are accomplished in one instance by the devices and means described in the following specification, but it is evident that the same may be varied widely without departing from the scope of the invention as pointed out in the appended claims.

A structure constituting one embodiment of the invention, which may be the preferred, is illustrated in the accompanying drawings, forming a part hereof, in which Figure I is a vertical longitudinal section through the transmission casing of an automobile, showing the relative position of the operating mechanism with respect to the transmission shaft.

Fig. II is a horizontal section taken on the line II—II of Fig. I, showing the relative position of the control lever and the locking mechanism.

Fig. III is a vertical sectional view taken along the line III—III of Figs. I and II, and illustrates the relative position of the shifting members and the means for locking the same.

Fig. IV is a sectional longitudinal view showing the shifting members in elevation and a slightly modified means of locking the same in inoperative position.

Fig. V is a view similar to Fig. IV, showing a further modification.

Similar reference characters refer to corresponding parts throughout the several views, and the sectional views are taken looking in the direction of the arrows at the ends of the section lines.

For convenience of illustration, the invention is shown as applied to a power transmitting mechanism having a single longitudinal rod on which the gear shifting members are slidably mounted, but it will be understood that this invention may be applied as well to any other form of transmission mechanism of a sliding gear type, as for example, a construction having two longitudinal rods having the forked gear shifting members mounted on each of said rods.

The sliding gear transmission mechanism shown, comprises a suitable casing 10 having bearings 11 and 12 at its ends for the driving shaft 13 and driven or transmission shaft 14. The casing is also provided with bearings for a countershaft 15, and secured upon the driving shaft is a gear 16 in mesh with a gear 17 on the countershaft 15 and adapted to transmit motion thereto. Gears 18 and 19 are mounted upon the driven shaft 14 to slide freely longitudinally thereof, and are operatively connected thereto to turn therewith. A plurality of gears 20, 21 and 22 are provided upon the countershaft to mesh with said gears 18 and 19 when the same are shifted into engagement therewith by means of forked arms 23 and 24 which engage suitable grooved collars 25 and 26 on the gears 18 and 19 respectively. A suitable gear clutch (not shown) is provided in the gear 18 to engage the teeth on the gear 16 and thus form a clutch to directly connect the driving and driven shafts. This construction of sliding gear change speed mechanism is old and well-known, and forms no part of this invention.

The transmission casing 10 is provided with a cover or housing 27 which contains bearings 28 to support a longitudinally extending rod or shaft 29. In the construction shown, it is preferable to secure the shaft 29 against longitudinal movement and to accomplish this, a pin or other securing means 30 is used to rigidly secure the shaft in the casing 27. The shifter arms 23 and 24 are provided with enlarged head portions 31 and 32, the same being provided with bearings 33 and 34 to slidably mount the shifter members on the shaft 29. The heads or shifting members 31 and 32 are provided with slots 35 and 36 to receive the head 37 upon the lower end of a shifting lever 38 which extends upwardly from the cover or housing 27 and is received in a bearing (not shown), which supports the shifting lever and allows it to be operated or shifted in both longitudinal and lateral directions.

Each of the longitudinally movable shifter members is provided with a plurality of depressions or grooves 39 formed therein and spaced from each other longitudinally of the shifter members for a purpose which will now be described. In the present instance the grooves or depressions formed in each rod are two in number, and the several grooves are substantially the same depth. Transversely extending openings 40 are formed within the housing or cover 27 in a horizontal plane, and are adapted to register with the slots 35 and 36 in the shifter heads when the same are brought to neutral position.

In order to prevent the simultaneous actuation of the two shifter members 31 and 32 by the lever 38, and in order to releasably hold the said shifter members in their different operative positions, there is provided a latching mechanism 41, positioned within each of the transverse openings 40 in such a manner as to be adapted to register with the slots 35 and 36 as well as with the grooves or depressions 39 formed in the enlarged heads or members 31 and 32 of the shifter arms 23 and 24. Each of the latching mechanisms comprises a plunger 42, the rounded end 43 of which is so positioned as to fit within one of the grooves or depressions 39 formed in one of the slidable head members 31 or 32. A cap 44 is positioned within the outer end of each of the passages 40 in such a manner as to entirely close the same, each of the caps being held in place by means of a pin 45. Each of the plungers 42 is provided with a hollow interior portion within which is positioned a coil compression spring 46, one end of which bears against the plunger 42, while the opposite end thereof seats upon an inwardly projecting portion 47 of the cap 44 so as to constantly force the plunger 42 into engagement with one of the longitudinally slidable heads 31 or 32.

In Figure II the transmission operating mechanism is shown in its neutral position, and in this neutral position, the head 37 of the control lever 38 is positioned in the slots 35 and 36, and the plungers 42 are also adapted to be received in these slots to force the control lever into the midway position. It will be readily understood that to move either of the slidable gear shifting members 31 or 32 from its neutral position, it will be necessary to move the control lever by a slight side movement and in so doing, one of the springs 46 will be compressed and the plunger 42 moved out of one of the slots 35 or 36. This will allow one of the gear shifting members to be moved to other than neutral position, but it will be impossible to move the other member, because the plunger 42 extends into one of the slots 35 or 36 and holds that member against movement while the other member is shifted to other than neutral position. When one of the gear shifting members is moved to operative position, the plunger 42 will engage one of the notches or slots 39 and thus retain this member in that operative position until it is desired to change the gear shifting mechanism to a different position. The grooves 39 are so positioned in the corresponding movable heads as to determine the position of the shifter arms and the gear controlled thereby in its two positions of meshing engagement with the gears co-operating therewith. When one of the slots 35 or 36, as the case may be, is in engagement with the latching mechanism 41 cooperating therewith, the corresponding slidable head is in neutral position, as is also the slidable gear which is controlled thereby.

Each of the shifter members 31 and 32 is provided on its inner face with a smooth plane surface, in such a manner that as either of the shifting members is moved to operative position, the inner surfaces of the two members will slide upon each other, or at any rate, with but a small space therebetween. The shifting members 31 and 32 are each provided with an extension 49 in which is formed a depression 50 to receive a gravity actuated member, preferably a ball 51. The depression 50 may be so formed as to fit the gravity actuated member closely throughout the extent of the depression, or it may depart slightly from that form in order to insure facility in the raising of the gravity member by the sliding of a shifter member out of neutral position. Where the ball 51 is employed as the gravity member, the depressions 50 should be so formed that when the ball is in operative position, less than half of it will lie within the depressions.

In Figs. II and III, the transmission mechanism is shown in its neutral position, and in this position, the depressions 50 are in registry and adapted to receive the gravity actuated member or ball 51. It will be understood that as either of the shifting members 31 or 32 is moved out of its neutral position into an operative position, the ball or other gravity member will be raised out of the depressions 50 and will ride on the upper surface of one of these members while the same is in position other than at neutral.

To lock the ball or other gravity actuated member 51 in the depressions 50 formed in the shifting members 31 and 32, I provide, in the preferred form of my invention, a rotatable lock 52 which is mounted in the cover or housing 27 of the gear casing. In the structure shown in Fig. I, the vertical axis of the rotatable lock 52 is offset from that of the ball 51. Movement of the ball in a horizontal plane is prevented by the walls of the circular opening 58 at the bottom of the lock bore in which the ball is located. The rotatable lock is provided with a portion 53, shown in the drawing as of reduced diameter, having at its lower end an inclined surface 54. When the rotatable lock is turned to the position shown in Fig. I, the lower inclined surface 54 engages the ball 51 and, in conjunction with the walls of the opening 58, holds the ball in the depressions 50. To secure the lock in this position, a key 57 is provided to operate any suitable mechanism for moving a plunger or pin 55 into an opening 56 formed in the housing 27. To release the ball, the key is operated to withdraw the pin 55 and then the entire lock is turned by means of the key through a portion of a revolution. After the pin 55 has been withdrawn from the opening 56 formed in the casing 27, and the entire lock rotated as just described, the inclined surface 54 at the lower end of the lock will be moved out of engagement with the ball 51, at which time the latter is free to move vertically in the opening 58 formed in the casing 27. To prevent removal of the rotatable lock 52 from the transmission housing 27 and to maintain the lock at the same elevation at all times, a pin 59 is secured in the casing, the inner end of the pin projecting into a slot 60 formed in the rotatable lock 52. The pin 59 riding in the slot 60 forms a guide for the lock and also prevents removal of the lock, but does permit the turning of the lock. I prefer to employ means to positively retain the lock in inoperative position, and to this end I have provided a hole 61 in the casing 27 into which the plunger or pin 55 may be slid either by spring pressure or by the manual operation of the key 57 when the lock is turned to unlocking position. In this position, the beveled surface 54 of the lock is withdrawn from the ball and allows free movement of the slidable gears so that the transmission mechanism may be operated.

In the construction shown in Fig. IV, I have illustrated a slightly modified form of my invention in which the lock 62 is not bodily rotatable, and in which it is provided at its lower end with a reduced portion 70, the lower end of which is rounded to engage the depressions 50 formed in the shifting members 31 and 32. In this modification, when the key 57 is turned to release the bolt or plunger 55 from the opening 56 in the casing 27, the entire lock 62 is free to move vertically, as either of the shifting members 31 or 32 is moved to operative position. Upon movement of the shifting members 31 and 32 to their neutral position, the reduced portion 70 of the lock 62 will drop into the depressions 50 and thereupon the lock may be rotated to bring the pin 55 into engagement with the opening 56 and thus lock the shifting members against movement. In order to maintain the pin 55 in alinement with the opening 56 and also to prevent removal of the whole lock when the pin 55 is retracted from engagement with the slot 56, I provide in the lock 62, a vertical slot 63 which receives the pin 59.

In Fig. V, I have shown a still further modification of my invention, wherein a rotatable lock 64 is provided with a curved slot 75 formed on the outer surface of said lock. A gravity actuated member, such as the ball 51, is adapted to be locked in the depressions 50 of the shifter members 31 and 32 in a manner similar to that described for the preferred form of my invention illustrated in Figs. I, II and III. To release the gravity actuated member from the depressions, the rotatable lock is rotated a predetermined distance, and because of the curved slot in the rotatable lock, the lock will be raised a sufficient distance so that the gravity actuated member is free to ride on the upper surface of either of the shiftable members 31 or 32 as the same are moved longitudinally to their operative positions. It will be understood that in this form of the invention, a second opening (not shown), corresponding to the opening 61 of Fig. III but at a different level from the opening 56 must be provided in order to receive the pin 55 to maintain the lock in elevated or unlocking position.

Means such as those described herein for releasably retaining each of the longitudinally slidable members 31, 32 in neutral position and also in each of its operative positions, are well-known. My invention provides in addition, means for positively locking both of the slidable members 31, 32 in their neutral position in such a manner as to positively prevent their disengagement therefrom until the locking means for retaining them in their neutral position is released. While I have described this mechanism as being locked in its neutral position, it will be obvious to those skilled in the art, that the same may be locked in any other position if so desired.

In the forms of the invention illustrated in Figs. I, II, III and V, there is a gravity actuated member 51 which I have shown as a ball. Some other form of detent entirely separate from the lock 52 or 64 may be utilized, but I prefer to employ a ball, because, on account of its ability to turn in every direction, I believe it offers less resistance to the movement of the shifter members than would any other form of gravity actuated member.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor any of them, except in so far as I have included such limitations within the terms of the following claims in which it is my intention to claim all novelty inherent in my invention broadly as well as specifically.

Having thus described my invention, what I claim as new and desire to secure by Letters Patent, is:

1. In a device of the class described, a pair of juxtaposed shifter arms selectively movable in parallel paths, said arms being provided on their upper faces with a common socket extending across their juxtaposed surfaces, said socket having inclined walls, a detent for said socket, a vertical guide for said detent, whereby the movement of one of said shifter arms will raise said detent and cause it to ride upon the upper surface of the arm, and means for holding said detent in said socket to lock said shifter arms against movement.

2. In a device of the class described a pair of juxtaposed shifter arms selectively movable in parallel paths, said arms being provided on their upper faces with a common socket extending across their juxtaposed surfaces, said socket having inclined walls, a detent for said socket, a vertical guide for said detent, whereby the movement of one of said shifter arms will raise said detent and cause it to ride upon the upper surface of the arm, and means adapted to move transversely of said guide to prevent the raising of said detent by said shifter arm.

3. In a device of the class described, a pair of juxtaposed shifter arms selectively movable in parallel paths, said arms being provided on their upper surfaces with a common socket of substantially hemispherical contour extending across their juxtaposed surfaces, a ball to fit said socket, a vertical guide for said ball, whereby the movement of one of said shifter arms will raise said ball and cause it to ride upon the upper surface of the arm, and means for holding said ball in said socket to lock said shifter arms against movement.

4. In a device of the class described, a pair of juxtaposed shifter arms selectively movable in parallel paths, said arms being provided on their upper surfaces with a common socket of substantially hemispherical contour extending across their juxtaposed surfaces, a ball to fit said socket, a vertical guide for said ball, whereby the movement of one of said shifter arms will raise said ball and cause it to ride upon the upper surface of the arm, and means movable substantially horizontally across said guide for preventing the raising of said ball by said shifter arm.

5. In a device of the class described, a plurality of shifter arms, means on which each shifter arm is slidably mounted, means for selectively moving the shifter arms, and means including a rotatable lock and a detent adapted to fall by gravity and positioned between said lock and said shifter arms for locking the shifter arms in a predetermined position.

6. The combination with a change speed mechanism having sliding gears, of shifting members movable longitudinally side by side for shifting said gears, means to shift said members longitudinally, gravity actuated means to simultaneously engage said members, and a rotatable lock cooperating with said gravity actuated means to lock said shifting members against movement.

7. The combination with a change speed mechanism having sliding gears, of shifting members movable longitudinally side by side for shifting said gears, means to shift said members longitudinally, a ball actuated by gravity to simultaneously engage both of said members, and a rotatable lock cooperating with said ball to lock said shifting members against movement.

8. The combination with a change speed mechanism having sliding gears, of shifting members movable longitudinally side by side for shifting said gears, means to shift said members longitudinally, depressions in said shifting members adapted to register when said shifting members are in a predetermined position, means actuated by gravity adapted to engage said depressions when the same are in registry, and rotatable means cooperating with said last named means to lock said shifting members in a predetermined position.

9. The combination with a change speed mechanism having sliding gears, of shifting members movable longitudinally side by side for shifting said gears, means to shift said members longitudinally, projections on said shifting members having depressions formed therein, said depressions being in registry when said shifting members are in a predemined position, means actuated by gravity to engage said depressions when the same are in registry and ride on said projections when the depressions are out of registry, and rotatable means to hold the last named means in said depressions and prevent movement of said shifting members.

10. In combination, a driving shaft, a driven shaft, a plurality of gears slidably mounted on said driven shaft, a plurality of shifter members to selectively shift said gears, depressions formed in said shifting members, said depressions being in registry when said shifting members are in a predetermined position, means actuated by gravity to engage said depressions when the same are in registry, a housing for said mechanism, and a rotatable lock having a beveled surface at one side thereof carried by said housing, and means to rotate said lock and bring the beveled surface of said lock into contact with said gravity actuated means to lock the shifter members against movement.

11. In combination, a driving shaft, a driven shaft, a plurality of gears slidably mounted on said driven shaft, a plurality of shifter members to selectively shift said gears, depressions formed in said shifter members, said depressions being in registry when said shifter members are in a predetermined position, means actuated by gravity to engage said depressions when the same are in registry, a rotatable lock carried by said housing, a slot in the outer surface of said lock, a pin carried by said housing and adapted to engage said slot, and means to rotate said lock to bring the same into contact with said gravity actuated means, and lock the shifter members against movement.

12. In a device of the class described, the combination of a transmission mechanism including a plurality of slidable gears, means for shifting said gears, depressions formed in said shifting means, a gravity actuated member adapted to co-operate with said depressions in said shifting means to prevent movement of said sliding gears, a casing for said mechanism, an opening in said casing to receive said gravity actuated means and prevent bodily movement of the same except in a vertical direction, and a rotatable lock supported in said housing adapted to lock said gravity actuated means in said depressions.

13. In a device of the class described, the combination of a transmission mechanism including a plurality of slidable gears, means for shifting said gears, depressions formed in said shifting means, a gravity actuated member adapted to co-operate with said depressions in said shifting means to prevent movement of said sliding gears, a casing for said mechanism, an opening in said casing to receive said gravity actuated means and prevent bodily movement of the same except in a vertical direction, and a rotatable lock supported in said housing, said lock being provided with a cam surface for holding said gravity actuated means in its depressed position.

14. In a device of the class described, the combination of a transmission mechanism including a plurality of slidable gears, means for shifting said gears, depressions formed in said shifting means, a gravity actuated member adapted to co-operate with said depressions to prevent movement of said shifting means, said member having a cam surface at the top thereof, a casing for said mechanism, an opening in said casing to receive said gravity actuated means and prevent bodily movement of the same except in a vertical direction, and a lock having an eccentrically arranged projecting portion for engaging said gravity actuated means.

15. In a device of the class described, a pair of selectively slidable shifter arms, said arms having concavities formed in their upper surfaces, adapted to align for forming a single depression, and a single gravity actuated means tending to enter said depression and lock said shifter arms in a predetermined position, but releasable by the mere movement of one of said shifter arms out of the aforesaid position, and a key operated lock for holding said gravity actuated means in locking position.

16. The combination with a change speed mechanism having sliding gears, of gear shifting members arranged side by side, said members having concavities in their upper surfaces adapted to align for forming a single depression having a bottom adapted to act as a lifting cam, means for selectively moving said members, a ball actuated by gravity to simultaneously engage said concavities and adapted to be raised by and ride upon said members as they are being shifted, and means co-operating with said ball to lock said shifting members against movement.

17. In a transmission mechanism of the sliding gear type, gear shifter members slidable side by side, means for locking said members against movement comprising a gravity actuated element movable bodily in a vertical direction only, stops in said shifter members adapted to be engaged simultaneously by said gravity element, said stops having cam surfaces adapted to raise said gravity element out of engagement with said stops when the shifter member is moved, and means for positively holding said gravity element in its depressed position.

In testimony whereof, I affix my signature.

SOLON J. BOUGHTON.